(12) United States Patent
Taguchi et al.

(10) Patent No.: US 8,219,352 B2
(45) Date of Patent: Jul. 10, 2012

(54) LOCALIZATION IN INDUSTRIAL ROBOTICS USING RAO-BLACKWELLIZED PARTICLE FILTERING

(75) Inventors: Yuichi Taguchi, Cambridge, MA (US); Tim Marks, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 170 days.

(21) Appl. No.: 12/751,366

(22) Filed: Mar. 31, 2010

(65) Prior Publication Data

US 2011/0246130 A1  Oct. 6, 2011

(51) Int. Cl.
*G06F 15/00* (2006.01)
(52) U.S. Cl. ............... 702/150; 702/94; 702/95; 702/97; 702/151; 702/152; 702/153; 702/179; 702/181; 700/245; 700/253; 700/258; 700/259; 701/23; 701/25; 701/26; 701/27; 701/28; 901/1; 901/14; 901/46; 901/47
(58) Field of Classification Search .................. 702/94, 702/95, 97, 150–153, 179, 181; 700/245, 700/253, 258, 259; 701/23, 25, 26, 207, 701/208; 901/1, 14, 46, 47
See application file for complete search history.

(56) References Cited

U.S. PATENT DOCUMENTS 8,055,382 B2 * 11/2011 Myeong et al. ............... 700/253

OTHER PUBLICATIONS

Kwak et al. "Result Representation of Rao-Blackwellized Particle Filteing for SLAM" Oct. 2008.*
Doucet et al. "Rao-Blackwellised Particle Filtering Dynamic Bayesian Networks".*
Li et al. "Novel Rao-Blackwellized Particle Filter for Mobile Robot SLAM Using Monocular Vision" 2006.*

* cited by examiner

*Primary Examiner* — Sujoy Kundu
(74) *Attorney, Agent, or Firm* — Dirk Brinkman; Gene Vinokur (57) ABSTRACT

Embodiments of the invention disclose a system and a method for determining a pose of a probe relative to an object by probing the object with the probe, comprising steps of: determining a probability of the pose using Rao-Black-wellized particle filtering, wherein a probability of a location of the pose is represented by a location of each particle, and a probability of an orientation of the pose is represented by a Gaussian distribution over orientation of each particle conditioned on the location of the particle, wherein the determining is performed for each subsequent probing until the probability of the pose concentrates around a particular pose; and estimating the pose of the probe relative to the object based on the particular pose.

25 Claims, 6 Drawing Sheets

Particle Update $(\mathcal{X}_{t-1}, u_t, z_t)$
$\mathcal{X}_t = \emptyset$ (the empty set)
for $j = 1$ to $J$ do
  retrieve $\langle s_0^{[j]}, s_{t-1}^{[j]}, \mu_{t-1}^{[j]}, \Sigma_{t-1}^{[j]}, w_{t-1}^{[j]} \rangle$ from $\mathcal{X}_{t-1}$
  // *Update position*
  $s_t^{[j]} \sim p(s_t | s_{t-1}^{[j]}, u_t)$
  // *Find contact feature with maximum likelihood*
  $\hat{s}_t^{o[j]} = R(\mu_{t-1}^{[j]})(s_t^{[j]} - s_0^{[j]}) + s_0^{[j]}$
  for $k = 1$ to $K$ do
    $\hat{h}_{k,t}^{[j]} = d(\hat{s}_t^{o[j]}, f_k)$
  end for
  $k_c = \arg\min_k \hat{h}_{k,t}^{[j]} / \sigma_k$
  // *Update angle and importance weight*
  $H_t^{[j]} = \frac{\partial h_{k_c}}{\partial \theta}(s_t^{[j]}, \mu_{t-1}^{[j]})$
  $q_t^{[j]} = H_t^{[j]} \Sigma_{t-1}^{[j]} H_t^{[j]T} + \sigma_{k_c}^2$
  $K_t^{[j]} = \Sigma_{t-1}^{[j]} H_t^{[j]T} / q_t^{[j]}$
  $\mu_t^{[j]} = \mu_{t-1}^{[j]} - K_t^{[j]} \hat{h}_{k_c,t}^{[j]}$
  $\Sigma_t^{[j]} = (I - K_t^{[j]} H_t^{[j]}) \Sigma_{t-1}^{[j]}$
  $w_t^{[j]} = w_{t-1}^{[j]} \cdot (2\pi q_t^{[j]})^{-1/2} \exp(-(\hat{h}_{k_c,t}^{[j]})^2 / 2q_t^{[j]})$
  add $\langle s_{0,t}^{[j]}, \mu_t^{[j]}, \Sigma_t^{[j]}, w_t^{[j]} \rangle$ to $\mathcal{X}_t$
end for
normalize $w_t^{[j]}$ such that $\sum_j w_t^{[j]} = 1$
// *Resampling*
$J_{\text{eff}} = 1 / \sum_j (w_t^{[j]})^2$
if $J_{\text{eff}} < J/2$ then
  if $J > J_{\min}$ then $J = J/2$ end if
  $\mathcal{X}_t =$ resample $J$ particles from $\mathcal{X}_t$ with probabilities $w_t^{[j]}$
  reset importance weights to $w_t^{[j]} = 1/J$
end if

LOCALIZATION IN INDUSTRIAL ROBOTICS USING RAO-BLACKWELLIZED PARTICLE FILTERING

FIELD OF THE INVENTION

This invention relates generally to industrial robotics, and more particularly to a probing-based method for probabilistic localization in industrial robotics.

BACKGROUND OF THE INVENTION

A number of industrial robotics applications, including automatic robotic assembly, require navigation of a robotic arm to a desired pose with respect to an object or to the environment. This problem is often formulated as a peg-in-hole problem in which a needle-like probe has a single point of contact with an object that can include a hole, and in which the initial pose of the probe with respect to the object is unknown. The pose of the probe with respect to the object has six degrees of freedom (6-DOF), comprising 3-DOF uncertainty in a position of the probe and 3-DOF uncertainty in an orientation of the probe with respect to the object. The initial pose uncertainty may greatly exceed a desired accuracy in all 6-DOF.

Several conventional methods use probing and particle-based Monte-Carlo localization to solve robotic peg-in-hole problems. For example, one method describes a localization using probing and particle filtering for lock and key assembly. The method first densely probes the object with the probe at every (x, y) to obtain a contact position (x, y, z), generating a contact configuration-space map, which describes all possible poses in which the probe has contact with the object. After this preprocessing step of dense probing, the method performs particle filtering by probing the object sequentially with the probe, using the contact positions obtained from the sequential probing as the observations. The observation likelihoods are evaluated using the contact configuration-space map.

Another method similarly describes an exhaustive preprocessing step, densely probing an object with a probe that can have multiple points of contact with the object, and using a force/torque sensor connected to the probe to generate a force-torque map. The force-torque map includes contact force and torque at every possible pose at which there is contact between the probe and the object. This method also describes estimating the force-torque map directly from a computer-aided design (CAD) model. However, the estimated force-torque map is not as accurate as the map acquired by the probing. Using the force-torque map that was acquired in advance by dense probing, particle filtering is used with sequential probing to match the force/torque observations to the map. The method also optionally incorporates observations from a camera.

However, the aforementioned methods are not well suited for full 6-DOF localization, because number of particles required for standard particle filtering increases roughly exponentially with the number of dimensions in the search space. Although those methods are described for uncertainty in up to six degrees of freedom (6-DOF), in practice the methods are only used for localization in lower-dimensional search spaces, such as 2-DOF space in which uncertainty only exists in x, y translation.

Accordingly, it is desired to have a method that can efficiently determine a pose between a probe and an object, wherein the pose has up to six degrees of freedom (6-DOF). It is also desired to have a map representation that can be determined directly from a CAD model of the object without a preprocessing step of dense probing, and that can account for varying levels of uncertainty in the map and for discrepancies between the CAD model and the object.

SUMMARY OF THE INVENTION

It is an object of the current invention to provide a method for determining a pose of a probe with respect to an object by probing the object with the probe.

It is a further object of the invention to provide such a method that can handle differences between a model of the object and measurements of the object, e.g., arising from errors of fabrication and measurement.

Embodiments of the invention are based on a realization that particle filtering applied to an estimation of the 6-DOF pose of the probe is computationally difficult, but the 6-DOF pose can be factorized in two parts, i.e., 3-DOF location and 3-DOF orientation, such that the estimated orientation of the probe depends on the estimated location of the probe and can be updated based on that location using Kalman filtering. Based on this realization, the 6-DOF particle filtering is reduced to 3-DOF particle filtering and 3-DOF Kalman filtering conditioned on the location of each particle, which results in a more efficient computation. The theoretical framework of such factorization is known as Rao-Blackwellized particle filtering.

One embodiment of the invention discloses a method for determining a pose of a probe relative to an object by probing the object with the probe, wherein the pose includes a location of the pose and an orientation of the pose, wherein each probing results in a point of contact between the probe and the object, such that the pose is estimated at each point of contact, comprising the steps of: representing a probability of the pose between the probe and the object by a set of particles, wherein a probability of the location of the pose is represented by a location of each particle, and a probability of the orientation of the pose is represented by a Gaussian distribution over an orientation of each particle conditioned on the location of the particle; relocating each particle to a next location according to a motion of the probe from the point of contact to a next point of contact, wherein the motion is caused by the probing; determining an importance weight of each particle based on the next location of the particle, the probability of orientation of the particle, and a map model of the object, wherein the importance weight is a probability that the particle represents the point of contact; updating the probability of orientation of each particle in the set of particles using Kalman filtering conditioned on the next location of each particle; repeating the relocating, the determining, and the updating until particles in the set of particles concentrate around a particular pose; and determining the pose of the probe relative to the object based on the particular pose, wherein the steps of the method are performed by a processor.

Also, one variation of this embodiment determines the map model based on an object model and an uncertainty model, wherein the uncertainty model is determined by assigning an uncertainty function to each feature of the object model, wherein the feature is a face, an edge, or a vertex.

Another embodiment discloses a method for determining a pose of a probe relative to an object by probing the object with the probe, comprising steps of: determining a probability of the pose using Rao-Blackwellized particle filtering, wherein a probability of a location of the pose is represented by a location of each particle, and a probability of a orientation of the pose is represented by a Gaussian distribution over orientation of each particle conditioned on the location of the particle, wherein the determining is performed for each subsequent probing until the probability of the pose concentrates around a particular pose; and estimating the pose of the probe relative to the object based on the particular pose.

Yet another embodiment discloses a system configured for determining a pose of a probe relative to an object by probing the object with the probe, wherein the pose includes a location of the pose and an orientation of the pose, wherein each probing results in a point of contact between the probe and the object, such that the pose is estimated at each point of contact, comprising: means for representing a probability of the pose of the probe relative to the object by a set of particles, wherein a probability of the location of the pose is represented by a location of each particle, and a probability of the orientation of the pose is represented by a Gaussian distribution over an orientation of each particle conditioned on the location of the particle; means for relocating each particle to a next location according to a motion of the probe from one probing's point of contact to a next probing's point of contact; means for determining an importance weight of each particle based on the next location of the particle, the probability of orientation of the particle, and a map model of the object, wherein the importance weight is a probability that the particle represents the point of contact; means for updating the probability of orientation of each particle in the set of particles using Kalman filtering conditioned on the next location of each particle; means for repeating the relocating, the determining, and the updating until particles in the set of particles concentrate around a particular pose; and means for determining the pose of the probe relative to the object based on the particular pose, wherein the steps of the method are performed by a processor.

DETAILED DESCRIPTION OF THE PREFERRED EMBODIMENTS

Figure 1:
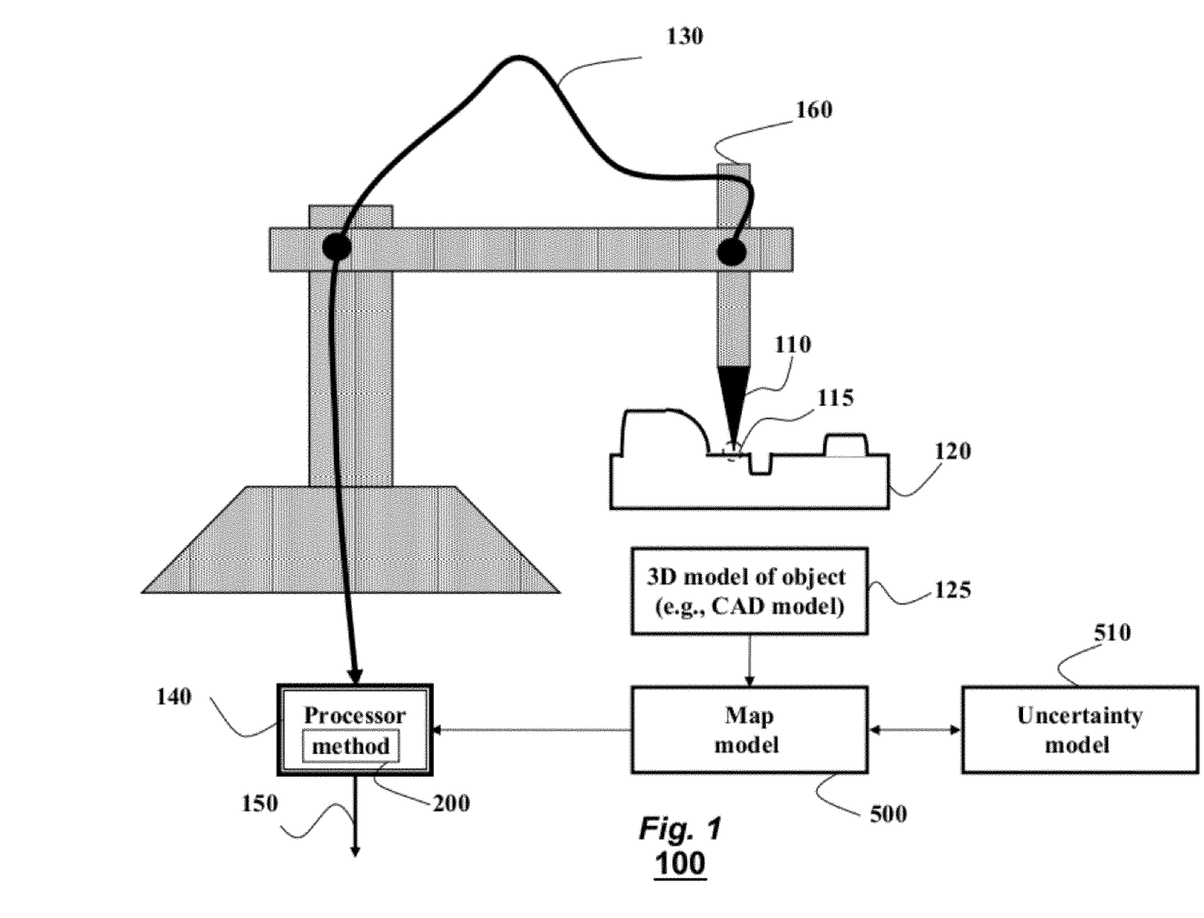
FIG. 1 is a schematic of a system and a method for determining a pose between a probe and an object according to the embodiments of the invention.

FIG. 1 shows a system 100 and a method 200 for determining a pose 150 of a probe 110 with respect to an object 120 by probing the object with the probe. In various embodiments of the invention, the probe is a touch probe or a touchless probe, e.g., an electrical, a mechanical, an optical, or a laser probe. Each probing determines a point of contact 115 between the probe and the object, and the pose is estimated at each point of contact. For example, in one embodiment, the probe is a mechanical probe having a needle-like shape, and each point of contact is a point at which the probe touches the object. In alternative embodiments, the probes are touchless probes and each point of contact is a location on a surface of the object determined by the touchless probes.

After the pose of the probe relative to the object is determined, the pose can be used in an industrial process, which can involve picking up the object, positioning the object, mating a part with the object, determining the pose of the robot with respect to the object, calibrating a robot coordinate system, or using a tool on the object, such as a spray gun, arc welder, drill, or grinder.

Figure 5:
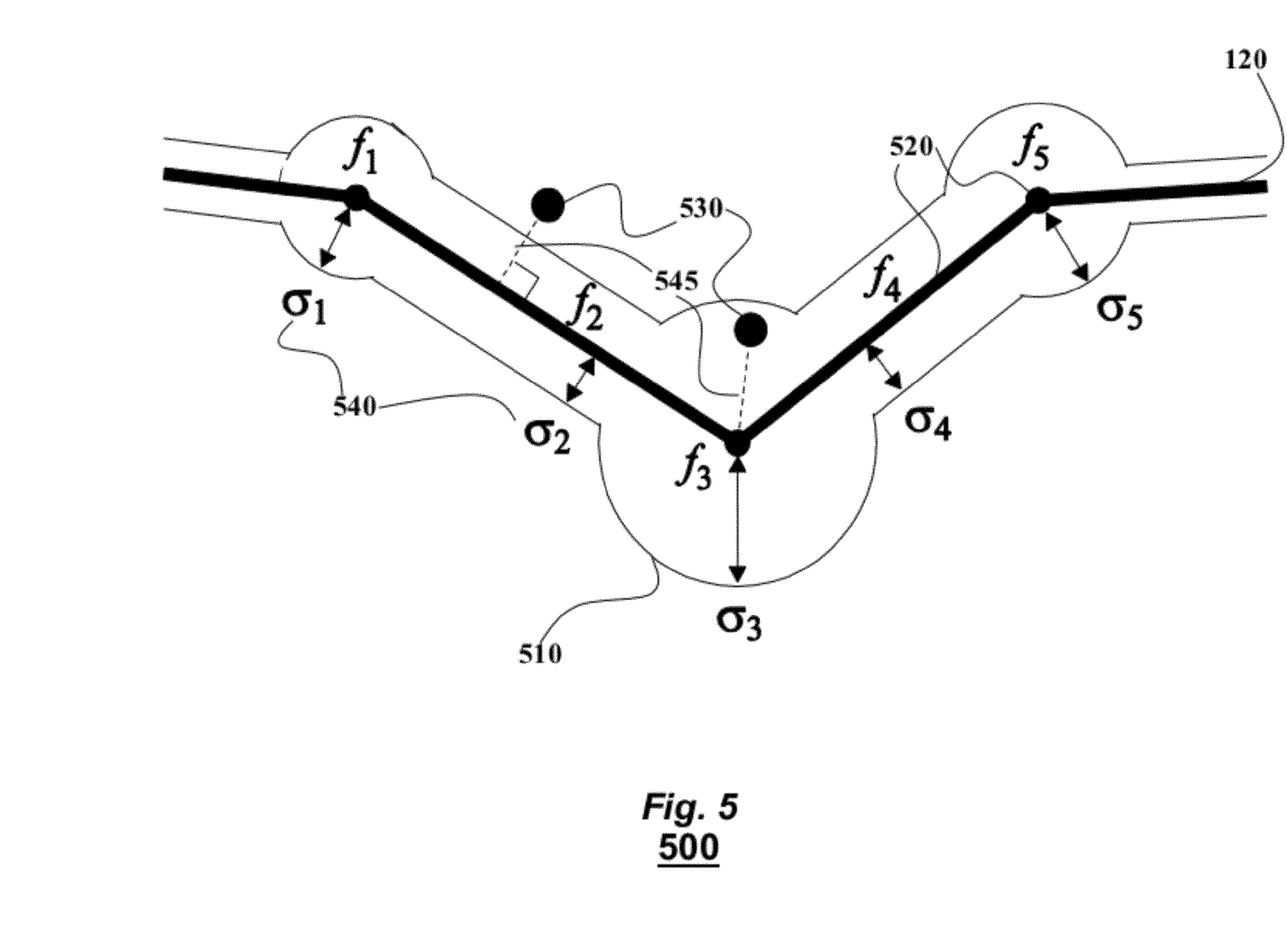
FIG. 5 is a schematic of a map model according the embodiments of the invention.

The object is represented by a map model 500 determined based on a three-dimensional (3D) model 125 of the object, such as a CAD model, and an uncertainty model 510, as described in more detail below. The system also includes a processor 140 performing steps of the method 200 according to embodiments of the invention. The processor includes input/output interfaces and memories as known in the art.

The probe is positioned in a vicinity of the object, but the pose of the probe with respect to the object is unknown and has uncertainty up to six degrees of freedom (6-DOF), including a location of the pose and an orientation of the pose. Typically, the location and the orientation of the pose are each three-dimensional, but in some embodiments, the location and/or the orientation of the pose have less than 3-DOF uncertainty.

In one embodiment, the probing is achieved by repositioning a robot arm 160 that holds the probe, moving the probe in general direction of the object until detecting a contact between the probe and the object, and measuring the location 130 of a point of contact in a robot coordinate system. In various embodiments, the location of the contact is detected and measured by built-in functions and encoders of the robotic arm, by a compliance control of the robot arm, and/or by an external sensor, such as a camera, a touch sensor, or a force sensor.

Embodiments of the invention are based on a realization that particle filtering applied to an estimation of the 6-DOF pose of the probe is computationally difficult, but the 6-DOF pose can be factorized in two parts, i.e., 3-DOF location and 3-DOF orientation, such that the orientation of the probe depends on the location of the probe and can be updated based on that location using Kalman filtering. Based on this realization, the 6-DOF particle filtering is reduced to 3-DOF particle filtering and 3-DOF Kalman filtering, which results in a more efficient computation. The theoretical framework of such factorization is known as Rao-Blackwellized particle filtering.

Figure 2:
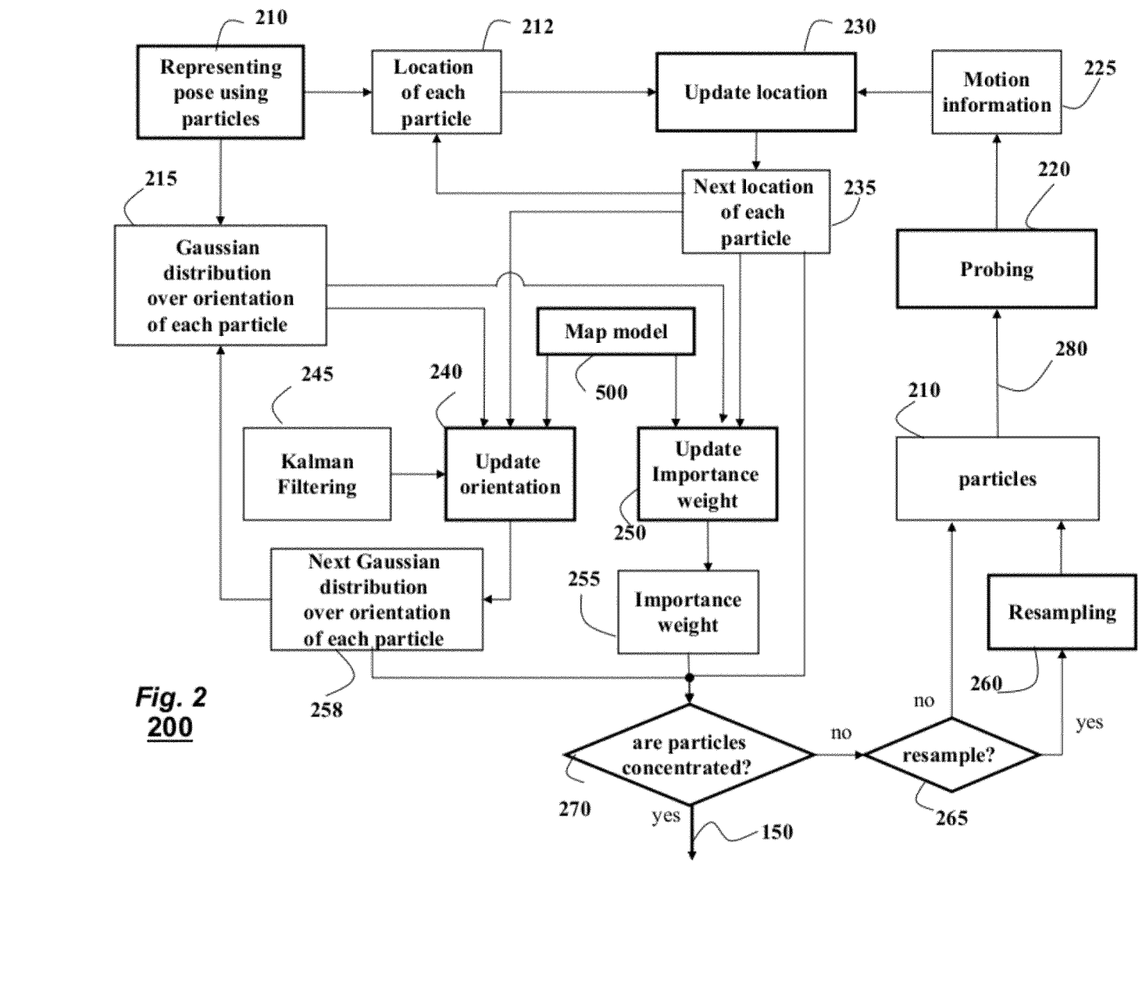
FIG. 2 is a block diagram of a method for determining a pose between a probe and an object according to the embodiments of the invention.

FIG. 2 shows a block diagram of the method 200 according to the embodiments of the invention. According to the aforementioned realization, the relative pose between the probe and the object is determined using a Rao-Blackwellized particle filter, in which a probability distribution over location (3-DOF translation) is represented using particles, i.e., each particle represents a specific hypothesis about the location, and a distribution over orientation (3-DOF rotation) is approximated by a Gaussian distribution for each particle, conditioned on the location of the particle. This factorization greatly improves the efficiency of the filtering, resulting in an orders-of-magnitude reduction in the number of particles required as compared to conventional particle filtering.

Therefore, a probability of the pose of the probe relative to the object is represented by a set of particles 210, wherein a probability of the location of the pose is represented by a location 212 of each particle, and a probability of the orientation of the pose is represented by a Gaussian distribution 215 over orientation for each particle conditioned on the location of the particle.

For each subsequent probing 220, a motion 225 of the probe is acquired, the location of each particle is updated 230 to a next location 235 according to the motion, and an importance weight 255 of each particle is updated 250 based on the next location of the particle, the Gaussian distribution over orientation of each particle, and the map model 500 of the object, wherein the importance weight is a probability that the location of the particle represents the point of contact 115 and that the orientation distribution of the particle represents the orientation of the probe with respect to the object. Also, the Gaussian distribution 215 over orientation of each particle is updated 240 using Kalman filtering 245, e.g., extended Kalman filtering (EKF), conditioned on the next location of the particle. The EKF produces a next estimate of probability distribution 258 over orientation conditioned on the next location of the particle.

If the particles in the set of particles 210 are concentrated 270 around a particular pose, the pose 150 of the probe relative to the object is determined based on that particular pose, e.g., averaging locations and the orientation of the particles. Otherwise, the repositioning, probing, and updating steps of the method 200 are repeated.

In one embodiment, a decision 265 is made whether to use the updated set of particles and importance weights for a subsequent probing, or to resample 260 the set of particles with probability proportional to the importance weight of each particle. If the set of particles is resampled, then with high probability, the particles with low importance weights will be removed from the set 210 and the particles with high importance weights will be represented multiple times in the set.

In one embodiment the map model of the object is generated based on the model of the object that is being probed, e.g., a computer-aided design (CAD) model, as well as based on an uncertainty model that represents any prior knowledge about the uncertainty of the CAD model. The uncertainty model incorporates uncertainty about different features of the object. Therefore, the map model is a probabilistic map model.

Usage of the map model according the embodiment of the invention is advantageous in situations in which actual measurements are not consistent with the CAD model. Such differences can arise from measurement errors due to numerous factors such as slipping and sensor imprecision, as well as from differences between the CAD model of the object and an actual shape of the object.

Probabilistic Dependencies

The pose of the probe relative to the object is represented as $(s, \theta)$, where $s=(x, y, z)^T$ and $\theta=(\alpha, \beta, \gamma)^T$ are relative positions and orientations, respectively, between the probe and the object. Angles $(\alpha, \beta, \gamma)$ are defined as angles of rotation around each of the (x, y, z) axes.

Figure 3:
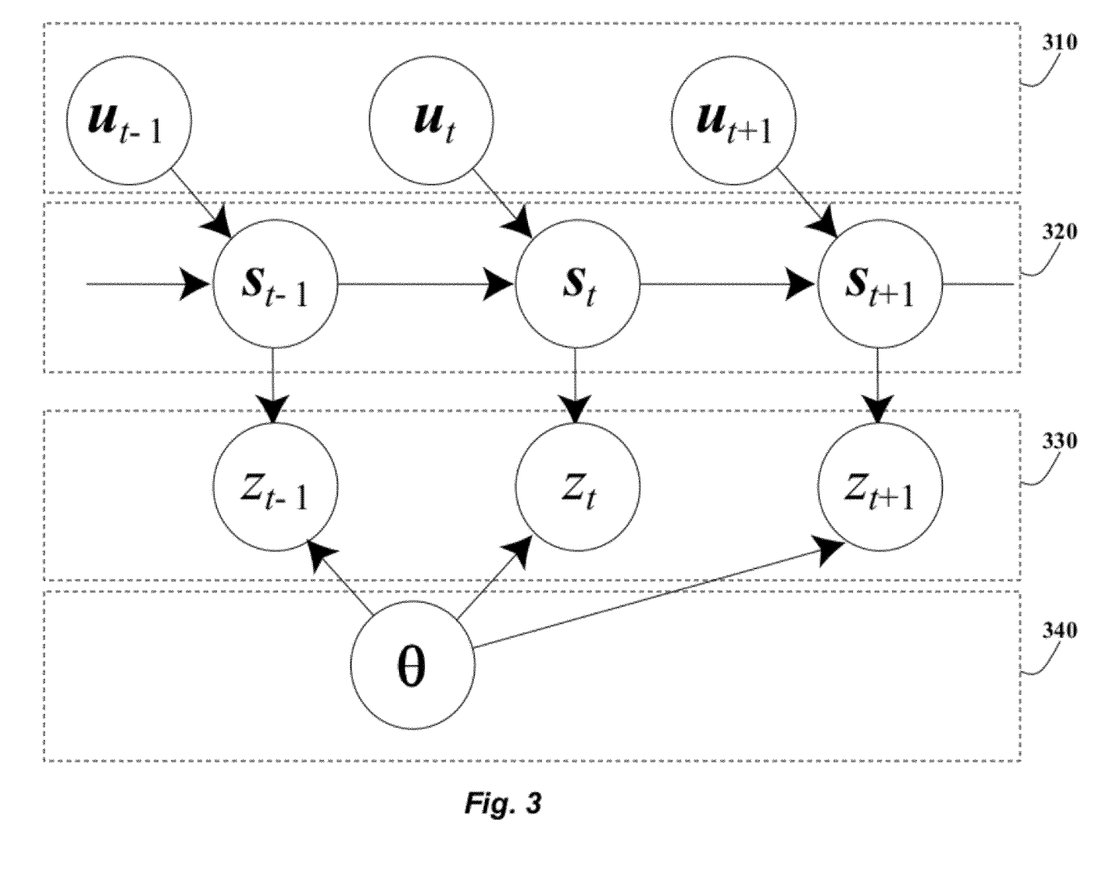
FIG. 3 is a schematic of probabilistic dependencies according to the embodiments of the invention.

FIG. 3 shows a graphical model of probabilistic dependencies used in the method 200. A sequence 310 of the motion of the probe from each point of contact to a next point of contact, wherein the motion is caused by each probing from time 1 to t, is defined as $u_{1:t}=\{u_1, \ldots, u_t\}$, where $u_i$ represents the motion from the point of contact at time i−1 to the point of contact at time i. A sequence 330 of contact events is defined as $Z_{0:t}=\{Z_0, \ldots, Z_t\}$. The embodiments factorize the probability of the pose of the probe relative to the object according to $$p(S_{0:t}, \theta | z_{0:t}, u_{1:t}) = p(S_{0:t} | Z_{0:t}, u_{1:t}) p(\theta | S_{0:t}, Z_{0:t}). \quad (1)$$

Accordingly, each particle represents a sequence of positions $S_{0:t}$ 320 of the points of contact and a Gaussian distribution 340 over the orientation between the probe and the object. The Gaussian distribution is represented by a mean $\mu_t$ and a covariance matrix $\Sigma_t$.

Typically, the contact event is binary, $Z_t \in \{1, 0\}$, where $Z_t=1$ if at a time instant t the probe has a contact with the object at position $S_t$, and $Z_t=0$ otherwise. However, the contact position is measured only at the time instant when the point of contact is sensed, i.e., $Z_t=1$ for each probing. Accordingly, for clarity, the probabilistic notation is simplified by representing $p(Z_t=1)$ using a shorthand $p(Z_t)$.

Coordinate Transformations

Figure 4:
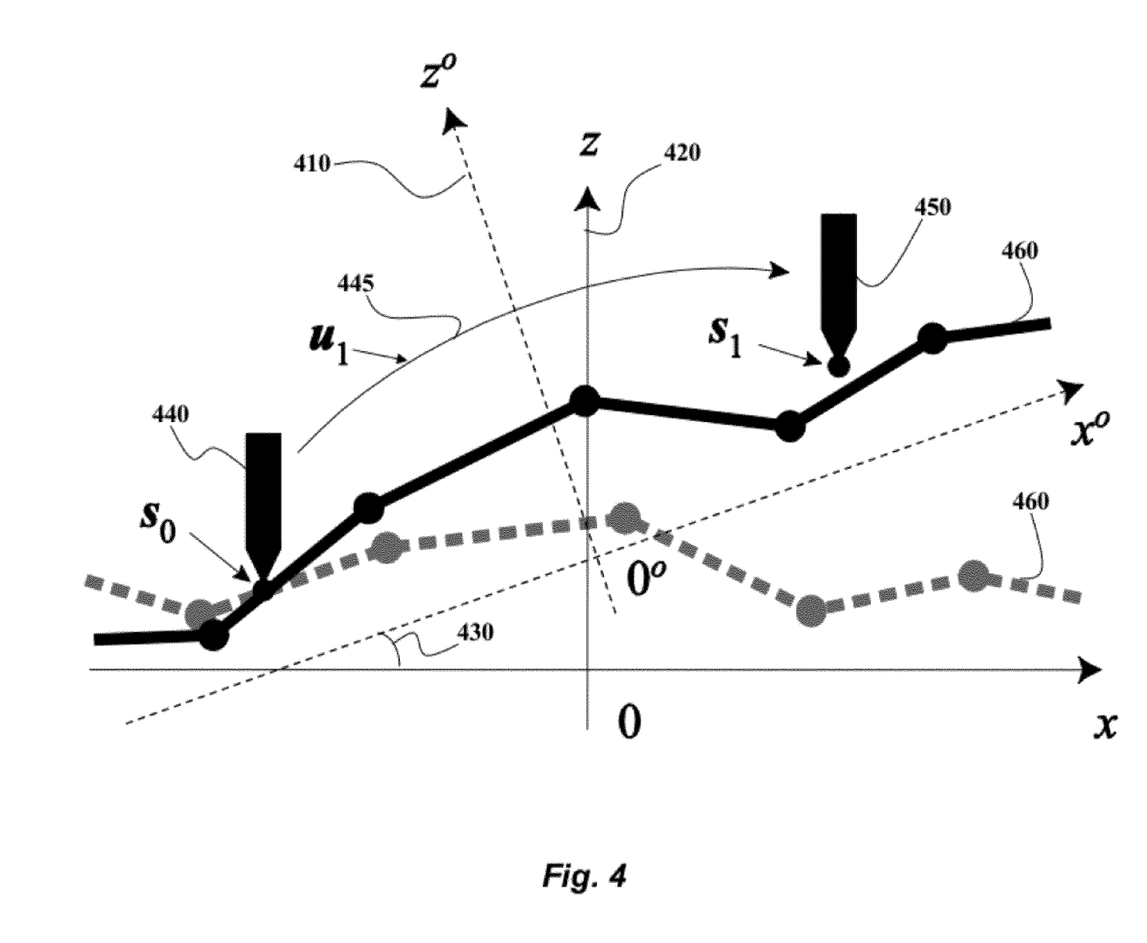
FIG. 4 is a schematic of coordinate transformation between an object coordinate system and a base coordinate system according to the embodiments of the invention.

FIG. 4 shows a coordinate transformation between an object coordinate system 410, which is fixed with respect to the object, and a base coordinate system 420, which is fixed with respect to a robot coordinate system, i.e., a frame of reference of the robotic arm (not shown). In some embodiments, the transformation between the robot coordinate system and the base coordinate system is a translation, without rotation, such that the motion of the probe is represented by the same translation in the base coordinate system as in the robot coordinate system.

The position of the probe at time t in the base coordinate system is defined as $S_t$. The position of the probe at time t in the object coordinate system is defined as $S_t^O$. The base coordinate system and the object coordinate system are related by a 3D rotation 430 $\theta$ about an initial position $S_0$ 440 of the probe. Thus, the initial position of the probe is the same in both the base and object coordinate systems. However, the orientation difference, $\theta$, between the two coordinate systems is unknown.

The map model 460 and the measurement probability are defined in the object coordinate system. At time t=0, the base and object coordinate systems are identical. At time t=1, after the motion 445 of the probe, the Gaussian distribution over orientation of each particle is updated, corresponding to a rotation of the object coordinate system with respect to the base coordinate system.

Motion

Each subsequent probing moves the probe from one point of contact to another. For each point of contact, the position of the probe in the robot coordinate system can be obtained from internal encoders of the robot arm. The motion of the probe from time t−1 to time t is identical in the robot coordinate system and in the base coordinate system. Using the motion $u_t$, the position of each particle in the base coordinate system is updated from the position $S_{t-1}$ to the next position $s_t$ according to $$s_t = s_{t-1} + u_t + \varepsilon_t \quad (2)$$

$$\varepsilon_t \sim N\left(0, \begin{pmatrix} \sigma_x^2 & 0 & 0 \\ 0 & \sigma_y^2 & 0 \\ 0 & 0 & \sigma_z^2 \end{pmatrix}\right),$$

where $N(\mu, \Sigma)$ represents the multivariate normal (Gaussian) distribution with mean $\mu$ and covariance matrix $\Sigma$, and $\sigma_x$, $\sigma_y$, $\sigma_z$ model the noise due to errors of robot motion or errors in the values obtained from the encoders of the robotic arm.

Some embodiments use values of $\sigma_x$, $\sigma_y$, $\sigma_z$ that are larger than the actual robot motion errors and encoder errors, to account for particle deprivation, wherein none of the particles has an exactly correct estimate of the initial contact position, so that the noise in the motion model enables the particle filter to compensate for this inaccuracy over time.

The position $S_t^O$ of the probe at time t in the object coordinate system is determined based on a rotation matrix R using the orientation $\theta = (\alpha, \beta, \gamma)^T$. The rotation matrix R is determined according to $$R(\theta) = \begin{pmatrix} c_\gamma c_\beta & c_\gamma s_\beta s_\alpha - s_\gamma c_\alpha & c_\gamma s_\beta c_\alpha + s_\gamma s_\alpha \\ s_\gamma c_\beta & s_\gamma s_\beta s_\alpha + c_\gamma c_\alpha & s_\gamma s_\beta c_\alpha - c_\gamma s_\alpha \\ -s_\beta & c_\beta s_\alpha & c_\beta c_\alpha \end{pmatrix}, \quad (3)$$

where $S_\alpha$ and $C_\alpha$ are shorthand for sin α and cos α, respectively.

Accordingly, the position of the probe in the object coordinates at time t is determined according to $$S_t^O = R(\theta)(S_t - S_0) + S_0. \quad (4)$$

Map Model

Some embodiments of the invention are based on a realization that a measurement model of the object should reflect uncertainties of object model design and measurement, e.g., differences between the object model and the actual shape of the object and imperfection in measurement tools and procedures. For example, the tip of the probe might be rounded or wide rather than sharp and needle-like, which would lead to measurement errors. Accordingly, we determine and include into the map model parameters of uncertainties determined for every feature of the model, such as a face (plane), an edge (line), and a vertex (point).

FIG. 5 shows one example of a map model 500 according to the embodiments of the invention. The map of the object is determined from the object model 125 and the uncertainty model 510. In some embodiments, the object model is generated from a CAD model of the object. The object model includes features $f_i$ 520 of the shape of the object, e.g., vertices, edges, and triangular faces. For example, as shown in FIG. 5, the features $f_1$, $f_3$, $f_5$ represent vertices or edges, and the features $f_2$, $f_4$ represent edges or faces.

In different embodiments, the uncertainty model is formulated using a wide range of probability fields or energy functions. For example, in one embodiment, the uncertainty model is formulated using Gaussian probability density functions of distances 545 between the points of contact 115 and the features 520 of the object model. The map model can assign different uncertainty values to different features of the object model, which enables users to incorporate knowledge of particular industrial settings or manufacturing processes into the map model.

The measurement uncertainties form the uncertainty model 510. For each feature $f_k$, where k={1, . . . , K}, a standard deviation of measurement uncertainty of the feature is defined as $\sigma_k$ 540. In one embodiment, larger uncertainty is assigned to the features, such as the edges and the vertices at intersection of planes, whose normals form large angles with each other. For example, in one variation of this embodiment, the maximum angle between the normals of all possible pairs of the faces that border each edge/vertex is determined, and the uncertainty is assigned based on the value of the maximum angle.

The measurement probability is determined based on the distance 545 between the object model and the point of contact $S^O$ 530 in the object coordinates. The distance from the point of contact to each feature $f_k$ is defined as $d(s^O, f_k)$. In one variation of this embodiment, the function d computes the Euclidean distance between the point of contact $s^O$ and the feature $f_k$. The distance to the face or the edge is determined if the perpendicular projection of the point of contact to the corresponding plane or line lies within that face or the edge.

For each point of contact, the distances to all features are determined and the feature with the smallest distance normalized by the corresponding standard deviation is selected as a contact feature. Thus, an index of the contact feature, $k_c$, is determined according to $$k_c = \arg\min_k \frac{d(s^O, f_k)}{\sigma_k}. \quad (5)$$

In one embodiment, a distance measure h is expressed either in the object coordinates as a function of $S^O$ or in the base coordinates as a function of the position s and the orientation θ, such that $$h_{k_c}(s, \theta) = d(S^O, f_{k_c}). \quad (6)$$

The measurement probability at time t for each particle is determined based on the distance measure according to $$p(Z_t|S_t, \theta) = N(h_{k_c}(S_t, \theta); 0, \sigma_{k_c}^2). \quad (7)$$

The notation N(X; μ, Σ) represents the multivariate normal (Gaussian) distribution over the variable x with mean μ and covariance matrix Σ.

Rao-Blackwellized Particle Filtering

Figure 6:
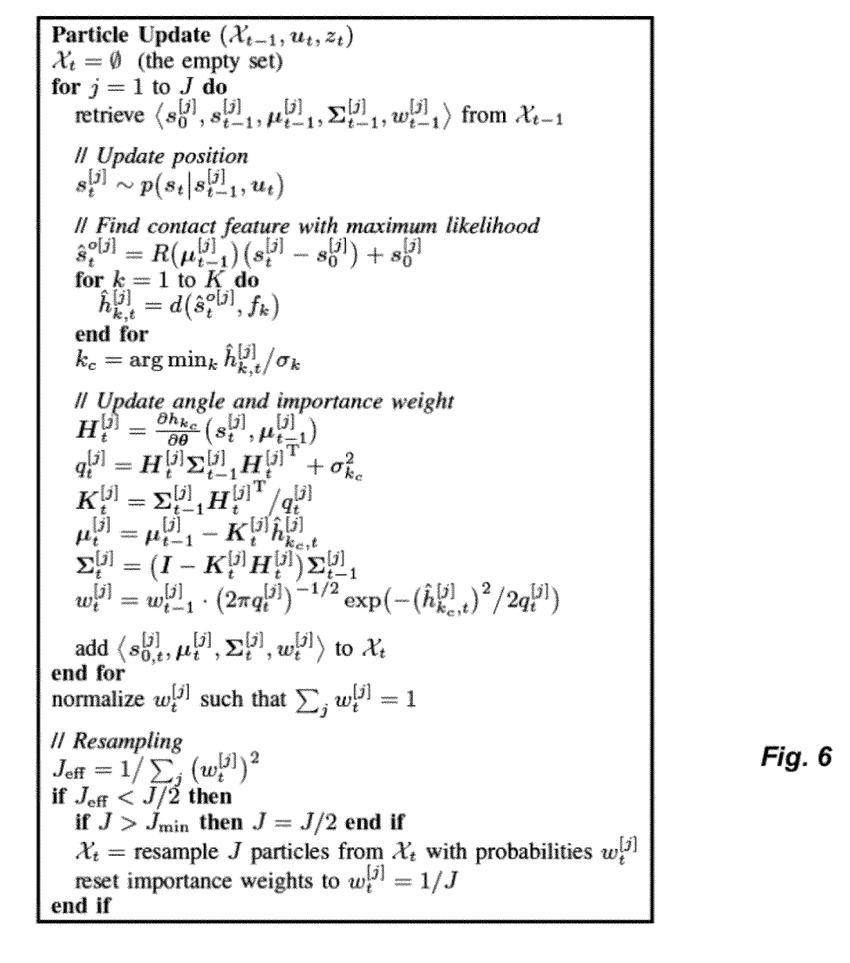
FIG. 6 is pseudocode for determining a probability of the pose between the probe and the object using Rao-Blackwellized particle filtering according to the embodiments of the invention.

FIG. 6 shows pseudocode for determining a probability of the pose of the probe relative to the object using Rao-Blackwellized particle filtering, wherein a probability of the location of the pose is represented by a location of each particle, and a probability of the orientation of the pose is represented by a Gaussian distribution over orientation of each particle conditioned on the location of the particle.

For each probing at time t, each particle j is associated with the position of the point of contact $S_t^{[j]}$ between the probe and the object, as well as with the normal distribution over the orientation $$p(\theta) = N(\theta; \mu_t^{[j]}, \Sigma_t^{[j]}).$$

Initialization

The method 200 samples J particles from a uniform distribution over the position (x, y) in base coordinates, bounded by a maximum initial (x, y) uncertainty. In one embodiment, the initial value of the z coordinate for each particle j is determined such that the initial particle position $S_0^{[j]} = (x, y, z)$ is set on the surface of the map model. For each particle, the Gaussian distribution over the orientation θ is initialized with mean $\mu_0^{[j]} = 0$ and a diagonal covariance matrix $\Sigma_0^{[j]}$ representing the initial uncertainty.

Particle Update for Each Probing

The set of particles at time t is defined as $X_t$. When the robot arm moves the probe from one contact position to the next, the position of each particle j={1, . . . , J} is updated based on the motion $u_t$ in the base coordinates obtained from the robot arm encoders and the observation $Z_t$ that the robot detects a contact. Based on each particle's next position, the distribution over the orientation θ for each particle is updated.

Position Update

The next position $S_t^{[j]}$ of particle j at time t is determined using Equation (2), based on the position of the particle $S_{t-1}^{[j]}$ and the motion $u_t$ according to $$S_t^{[j]} \sim p(S_t|S_{t-1}^{[j]}, u_t) \quad (8)$$

Orientation Update

Based on the next position of the particle $S_t^{[j]}$ in base coordinates, and the observation $Z_t$ that there was a contact between the probe and the object, the posterior distribution for each particle over the orientation θ is determined using EKF. One embodiment expresses the measurement probability as a function of the orientation and linearizes that measurement probability about $\theta=\mu_{t-1}^{[j]}$, i.e., the mean of the distribution of the orientation for the particle determined after the previous probing.

To linearize the measurement probability about $\theta=\mu_{t-1}^{[j]}$, the predicted position $\hat{S}_t^{O[j]}$ of each particle in the object coordinate system is determined based on the mean and Equation (4) according to $$\hat{S}_t^{O[j]} = R(\mu_{t-1}^{[j]})(S_t^{[j]} - S_0^{[j]}) + S_0^{[j]}. \tag{9}$$

The predicted particle position $\hat{S}_t^{O[j]}$ is used to determine the index of the contact feature, $k_c$ according to Equation (5).

We use the measurement probability (7) defined with respect to the contact feature, $f_{k_c}$, to update the posterior probability over angle, which is the second factor on the right hand side of (1).

Accordingly, the posterior probability further factorizes as $$p(\theta \mid s_{0:t}, z_{0:t}) \propto p(z_t \mid \theta, s_{0:t}, z_{0:t-1}) p(\theta \mid s_{0:t}, z_{0:t-1}) = \tag{10}$$

$$\frac{p(z_t \mid s_t, \theta)}{N\left(h_{k_c}(s_t^{[j]}, \theta); 0, \sigma_{k_c}^2\right)} \cdot \frac{p(\theta \mid s_{0:t}, z_{0:t-1})}{N\left(\theta; \mu_{t-1}^{[j]}, \Sigma_{t-1}^{[j]}\right)}.$$

The Equation (10) is used to approximate the posterior probability of the orientation as a Gaussian distribution. One embodiment uses EKF by linearizing the measurement function about $\theta=\mu_{t-1}^{[j]}$ according to $$h_{k_c}(s_t^{[j]}, \theta) \approx h_{k_c}(s_t^{[j]}, \mu_{t-1}^{[j]}) + \frac{\partial h_{k_c}}{\partial \theta}(s_t^{[j]}, \mu_{t-1}^{[j]})(\theta - \mu_{t-1}^{[j]}) \tag{11}$$

$$= \hat{h}_{k_c,t}^{[j]} + H_t^{[j]}(\theta - \mu_{t-1}^{[j]})$$

where $\hat{h}_{k_c,t}^{[j]} = d(\hat{S}_t^{O[j]}, f_{k_c})$ is the distance measure determined at the predicted position $\hat{S}_t^{O[j]}$, and $H_t^{[j]}$ the Jacobian of the distance measure with respect to the orientation θ determined according to $$H_t^{[j]} = \left(\frac{\partial h_{k_c}}{\partial \alpha}, \frac{\partial h_{k_c}}{\partial \beta}, \frac{\partial h_{k_c}}{\partial \gamma}\right)\bigg|_{(s,\theta)=(s_t^{[j]}, \mu_{t-1}^{[j]})}. \tag{12}$$

The posterior distribution over the orientation is then computed using standard EKF measurement update rule, according to $$K_t^{[j]} = \Sigma_{t-1}^{[j]} H_t^{[j]T} (H_t^{[j]} \Sigma_{t-1}^{[j]} H_t^{[j]T} + \sigma_{k_c}^2)^{-1} \tag{13}$$

$$\mu_t^{[j]} = \mu_{t-1}^{[j]} - K_t^{[j]} \hat{h}_{k_c,t}^{[j]} \tag{14}$$

$$\Sigma_t^{[j]} = (I - K_t^{[j]} H_t^{[j]}) \Sigma_{t-1}^{[j]} \tag{15}$$

Importance Weight Update and Resampling

At each time t, the importance weight $w_t^{[j]}$ of each particle j is determined from the particle's previous importance weight $w_{t-1}^{[j]}$ and the measurement probability. In one embodiment of the invention, the importance weight is updated by marginalizing the measurement probability over the orientation of the particle according to $$w_t^{[j]} \propto w_{t-1}^{[j]} \cdot p(z_t \mid s_t^{[j]}) = w_{t-1}^{[j]} \cdot \int p(z_t \mid s_t^{[j]}, \theta) p(\theta \mid s_t^{[j]}) d\theta = \tag{16}$$

$$w_{t-1}^{[j]} \cdot \int \frac{p(z_t \mid s_t^{[j]}, \theta)}{N\left(h_{k_c}(s_t^{[j]}, \theta); 0, \sigma_{k_c}^2\right)} \cdot \frac{p(\theta \mid s_{0:t-1}^{[j]}, z_{0:t-1})}{N\left(\theta; \mu_{t-1}^{[j]}, \Sigma_{t-1}^{[j]}\right)} d\theta$$

Accordingly, $$w_t^{[j]} \propto w_{t-1}^{[j]} \cdot (2\pi q_t^{[j]})^{-1/2} \exp(-(\hat{h}_{k_c,t}^{[j]})^2 / 2q_t^{[j]}), \tag{17}$$

where $$q_t^{[j]} = H_t^{[j]} \Sigma_{t-1}^{[j]} H_t^{[j]T} + \sigma_{k_c}^2. \tag{18}$$

To keep the diversity of particles at a reasonable level, one embodiment estimates, for each probing, an effective number $J_{eff}$ of particles according to $$J_{eff} = \frac{1}{\sum_{j=1}^{J} (w_t^{[j]})^2}. \tag{19}$$

If $J_{eff}$ is less than a threshold determined based on a number of particles in the set of particles, e.g., $J_{eff} < J/2$, the particles are resampled 260 with a probability proportional to the weights $w_t^{[j]}$ of the particles. After resampling, all particle weights are reset to $w_t^{[j]} = 1/J$.

If the particles are not resampled at time t, e.g., if $J_{eff} \geq J/2$, then all particles with the importance weights determined according to Equation (17) are preserved in the set of particles 210.

In one embodiment, a relatively large number of particles are used initially in the set 210. After several iterations of the method 200, however, the number of particles required for localization decreases. The number of particles is reduced at each resampling, until the number of particles reaches a predefined number, $J_{min}$. One variation of this embodiment reduces the number of particles in the set by half, by resampling only half as many as the current number of particles, if the number of particles J is greater than $J_{min}$ before the resampling.

Concentration

Embodiments of the invention repeat the probing and the resampling of the set of particles until the particles in the set of particles concentrate around a particular pose. In one embodiment, the concentration is determined based on a weighted average and a weighted covariance of the positions of the particles in the object coordinate system according to $$\bar{s}_t^o = \sum_{j=1}^{J} w_t^{[j]} s_t^{o[j]}, \text{ and} \tag{20}$$

$$\Psi_t^o = \frac{\sum_{j=1}^{J} w_t^{[j]} (s_t^{o[j]} - \bar{s}_t^o)(s_t^{o[j]} - \bar{s}_t^o)^T}{1 - \sum_{j=1}^{J} (w_t^{[j]})^2} \tag{21}$$

where $S_t^{O[j]}$ is determined using Equation (4) according to $$S_t^{O[j]} = R(\mu_t^{[j]})(S_t^{[j]} - S_0^{[j]}) + S_0^{[j]}. \tag{22}$$

The probing is repeated until the trace of the covariance matrix $\Psi_t^O$ is less than a predetermined threshold indicating that uncertainty among particle positions is small. Once this convergence condition is achieved, the estimated position of the pose is determined based on the weighted average of the positions of all particles remaining in the set. The estimated orientation of the pose is determined based on a weighted average of the mean orientation of the particles.

The determined pose can be directly used for subsequent industrial processes. The pose can be further refined by using the determined pose as the initial estimate for a pose estimation algorithm such as iterative closest point, which minimizes a cost function by using all the points of contact simultaneously.

Although the invention has been described with reference to certain preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a pose of a probe relative to an object based on probing the object with the probe and Rao-Blackwellized particle filtering, wherein the pose includes a location of the pose and an orientation of the pose, wherein each probing determines a point of contact between the probe and the object, such that the pose is estimated at each point of contact, comprising the steps of:
    representing a probability of the pose between the probe and the object by a set of particles, wherein a probability of the location of the pose is represented by a location of each particle, and a probability of the orientation of the pose is represented by a Gaussian distribution over an orientation of each particle conditioned on the location of the particle;
    relocating each particle to a next location according to a motion of the probe from the point of contact to a next point of contact, wherein the motion is caused by the probing;
    determining an importance weight of each particle based on the next location of the particle, the probability of orientation of the particle, and a map model of the object, wherein the importance weight is a probability that the particle represents the pose of the probe relative to the object;
    updating the probability of orientation of each particle in the set of particles using Kalman filtering conditioned on the next location of each particle;
    repeating the relocating, the determining, and the updating until particles in the set of particles concentrate around a particular pose; and
    determining the pose of the probe relative to the object based on the particular pose, wherein the steps of the method are performed by a processor.

2. The method of claim 1, further comprising:
    determining the map model based on an object model and an uncertainty model.

3. The method of claim 2, further comprising:
    determining the uncertainty model by assigning an uncertainty function to each feature of the object model, wherein the feature is a face, an edge, or a vertex.

4. The method of claim 3, further comprising:
    defining the uncertainty function around each feature of the object model as a Gaussian probability density function of a distance between the point of contact and the feature.

5. The method of claim 4, further comprising:
    determining a probability of the observation of a contact event at time t according to $$p(z_t|s_t,\theta)=N(h_{k_c}(s_t,\theta);0,\sigma_{k_c}^2),$$

wherein $p(.)$ is a probability function, $s_t$ represents the position of the particle, $\theta$ represents the orientation of the particle, $z_t$ is an observation of a contact between the probe and the object at the time t, h is a distance measure, $k_c$ is an index of a contact feature $f_{k_c}$, $\sigma_{k_c}^2$ is the variance of the uncertainty function of the contact feature, and $N(x; \mu, \sigma^2)$ represents a probability density function that is a Gaussian distribution over the variable x with mean $\mu$ and variance $\sigma^2$.

6. The method of claim 4, further comprising:
    determining the uncertainty function of each feature based on an angle between pairs of neighboring features of the object model.

7. The method of claim 1, further comprising:
    resampling, after the updating, the set of particles based on the importance weight of each particle.

8. The method of claim 1, further comprising:
    representing all of the particles in the set of particles in a single base coordinate system;
    defining an object coordinate system for each particle in the set of particles, wherein a rotation between the base coordinate system and the object coordinate system of each particle corresponds to the orientation of the pose of each particle, and a center of the rotation is an initial location of the pose of the particle;
    expressing the motion of the probe in the base coordinate system; and
    expressing the map model in the object coordinate system.

9. The method of claim 1, wherein the probing is achieved by repositioning the probe by an arm of a robot, and moving the probe in the general direction of the object until detecting a contact between the probe and the object, further comprising:
    receiving a position of the point of contact from encoders of the arm of the robot.

10. The method of claim 9, wherein the repositioning is performed randomly, or based on a predetermined sequence of locations, or based on the locations and the orientations of the particles in the set of particles.

11. The method of claim 7, further comprising:
    determining an effective number of particles in the set of particles; and
    resampling the set of particles based on the importance weight of each particle, if the effective number is less than a threshold, wherein the threshold is determined based on the number of particles in the set of particles.

12. The method of claim 1, further comprising:
    determining the next location of the particles according to $$S_t^{[j]} \sim p(S_t|S_{t-1}^{[j]},u_t),$$

wherein $S_{t-1}^{[j]}$ is the location of the particle j at time t−1, $S_t^{[j]}$ is the next location of particle j, and $u_t$ represents the motion of the probe from the point of contact of the probing at time t−1 to the point of contact of the probing at time t.

13. The method of claim 1, further comprising:
    updating the parameters of the Gaussian distribution over the orientation of the pose of particle j according to $$\mu_t^{[j]}=\mu_{t-1}^{[j]}-K_t^{[j]}\hat{h}_{k_c,t}^{[j]},$$

$$\Sigma_t^{[j]}=(I-K_t^{[j]}H_t^{[j]})\Sigma_{t-1}^{[j]},$$

wherein $\mu_{t-1}^{[j]}$ is a mean of the Gaussian distribution of particle j at time t−1, $\mu_t^{[j]}$ is a mean of a next Gaussian distribution of particle, $\Sigma_{t-1}^{[j]}$ is a covariance matrix of the Gaussian distribution of particle j at time t−1, $\Sigma_t^{[j]}$ is the covariance matrix of the next Gaussian distribution of particle j, and $\hat{h}_{k_c,t}^{[j]}$ is a distance measure at a predicted position of the particle j using a contact feature $k_c$, and $$K_t^{[j]} = \Sigma_{t-1}^{[j]} H_t^{[j]T} (H_t^{[j]} \Sigma_{t-1}^{[j]} H_t^{[j]T} + \sigma_{k_c}^2)^{-1},$$

wherein $\sigma_{k_c}^2$ is an uncertainty measure of the contact feature $k_c$.

14. The method of claim 13, further comprising:
determining the importance weight at time t of the particle j, $w_t^{[j]}$ according to $$w_t^{[j]} \propto w_{t-1}^{[j]} \cdot (2\pi q_t^{[j]})^{-1/2} \exp(-(\hat{h}_{k_c,t}^{[j]})^2 / 2 q_t^{[j]}),$$

wherein $$q_t^{[j]} = H_t^{[j]} \Sigma_{t-1}^{[j]} H_t^{[j]T} + \sigma_{k_c}^2.$$

15. The method of claim 1, further comprising:
determining whether the particles in the set of particles concentrate around the particular pose by comparing a trace of a covariance matrix of the locations of the particles in the object coordinate system with a predetermined threshold.

16. The method of claim 9, wherein the detecting the point of contact is achieved using at least one of a built-in impact detection function of the robot arm, a compliance control of the robot arm, and an external sensor.

17. The method of claim 1, wherein the pose of the probe relative to the object is used in an industrial process.

18. The method of claim 17, wherein the industrial process includes at least one act of picking up the object, positioning the object, mating a part with the object, determining a pose of a robot with respect to the object, using a tool on the object, and calibrating a robot coordinate system.

19. A method for determining a pose of a probe relative to an object by probing the object with the probe, comprising steps of:
determining a probability of the pose using Rao-Blackwellized particle filtering, wherein a probability of a location of the pose is represented by a location of each particle, and a probability of a orientation of the pose is represented by a Gaussian distribution over orientation of each particle conditioned on the location of the particle, wherein the determining is performed for each subsequent probing until the probability of the pose concentrates around a particular pose; and
estimating the pose of the probe relative to the object based on the particular pose, wherein the steps of the method are performed by a processor.

20. The method of claim 19, wherein the determining further comprises:
relocating each particle to a next location according to a motion of the probe from the point of contact to a next point of contact, wherein the motion is caused by the probing;
determining an importance weight of each particle based on the next location of the particle, the probability of orientation of the particle, and a map model of the object, wherein the importance weight is a probability that the particle represents the point of contact; and
updating the probability of orientation of each particle in the set of particles using Kalman filtering conditioned on the next location of each particle.

21. The method of claim 20, further comprising:
determining the map model based on an object model and an uncertainty model.

22. The method of claim 20, further comprising:
resampling, after the updating, the set of particles based on the importance weight of each particle.

23. A system configured for determining a pose of a probe relative to an object based on probing the object with the probe and Rao-Blackwellized particle filtering, wherein the pose includes a location of the pose and an orientation of the pose, wherein each probing results in a point of contact between the probe and the object, such that the pose is estimated at each point of contact, comprising:
means for representing a probability of the pose of the probe relative to the object by a set of particles, wherein a probability of the location of the pose is represented by a location of each particle, and a probability of the orientation of the pose is represented by a Gaussian distribution over an orientation of each particle conditioned on the location of the particle;
means for relocating each particle to a next location according to a motion of the probe from the point of contact to a next point of contact, wherein the motion is caused by the probing;
means for determining an importance weight of each particle based on the next location of the particle, the probability of orientation of the particle, and a map model of the object, wherein the importance weight is a probability that the particle represents the point of contact;
means for updating the probability of orientation of each particle in the set of particles using Kalman filtering conditioned on the next location of each, particle;
means for repeating the relocating, the determining, and the updating until particles in the set of particles concentrate around a particular pose; and
means for determining the pose of the probe relative to the object based on the particular pose, wherein the steps of the method are performed by a processor.

24. The system of claim 23, further comprising:
means for determining the map model based on an object model and an uncertainty model.

25. The system of claim 23, further comprising:
means for resampling the set of particles based on the importance weight of each particle, between the updating and the repeating.

* * * * *